United States Patent
Odry et al.

(10) Patent No.: US 7,756,316 B2
(45) Date of Patent: Jul. 13, 2010

(54) METHOD AND SYSTEM FOR AUTOMATIC LUNG SEGMENTATION

(75) Inventors: Benjamin Odry, West New York, NJ (US); Shuping Qing, Princeton, NJ (US); Hong Shen, Plainsboro, NJ (US)

(73) Assignee: Siemens Medicals Solutions USA, Inc., Malvern, PA (US)

( * ) Notice: Subject to any disclaimer, the term of this patent is extended or adjusted under 35 U.S.C. 154(b) by 893 days.

(21) Appl. No.: 11/565,711

(22) Filed: Dec. 1, 2006

(65) Prior Publication Data

US 2007/0127802 A1 Jun. 7, 2007

Related U.S. Application Data

(60) Provisional application No. 60/742,439, filed on Dec. 5, 2005.

(51) Int. Cl.
*G06K 9/00* (2006.01)
(52) U.S. Cl. .................. 382/131; 382/173; 382/190
(58) Field of Classification Search .............. None
See application file for complete search history.

(56) References Cited

U.S. PATENT DOCUMENTS

| | | | |
|---|---|---|---|
| 5,881,124 A * | 3/1999 | Giger et al. ............. 378/8 |
| 7,046,833 B2 | 5/2006 | Masumoto et al. | |
| 7,206,462 B1 * | 4/2007 | Betke et al. ............. 382/280 |
| 2002/0006216 A1 * | 1/2002 | Armato et al. ........... 382/131 |
| 2003/0068074 A1 | 4/2003 | Hahn | |
| 2003/0072480 A1 | 4/2003 | Tsujii | |
| 2003/0095692 A1 | 5/2003 | Mundy et al. | |
| 2004/0114800 A1 | 6/2004 | Ponomarev et al. | |
| 2005/0207630 A1 | 9/2005 | Chan et al. | |
| 2006/0023927 A1 * | 2/2006 | Zhang et al. ............ 382/131 |
| 2006/0173271 A1 | 8/2006 | Shen et al. | |
| 2007/0053562 A1 * | 3/2007 | Reinhardt et al. ......... 382/128 |
| 2007/0058865 A1 * | 3/2007 | Li et al. ................. 382/173 |

OTHER PUBLICATIONS

Stringham, et al., "Probabilistic segmentation using edge detection and region growing," SPIE Visualization in Biomedical Computing 1992, vol. 1808, pp. 40-51.*

Silveira, M. et al., "Automatic Segmentation of the Lungs Using Multiple Active Contours and Outlier Model," 2006 Conference paper of Institute for Systems and Robotics—Lisbon, downloaded from http://www.welcome.isr.ist.utl.pt/imq/pdfs/1495_lung_segmentatiaon_embc2006.pdf on Nov. 17, 2006.

* cited by examiner

Primary Examiner—Charles Kim

(57) ABSTRACT

Disclosed is a systematic way of automatically segmenting lung regions. To increase the efficiency of a lung segmentation technique, a region-based technique, such as region growing, is performed by a computer on a middle slice of the CT volume. A contour-based technique is then used for a plurality of non-middle slices of the CT volume. This allows the implementation to be multithreaded and results in an improvement in the segmentation algorithm's efficiency.

32 Claims, 7 Drawing Sheets

METHOD AND SYSTEM FOR AUTOMATIC LUNG SEGMENTATION

This application claims the benefit of U.S. Provisional Application No. 60/742,439, filed Dec. 5, 2005, which is incorporated herein by reference.

BACKGROUND OF THE INVENTION

Computer Axial Tomography (CAT), sometimes known generally as Computerized Tomography (CT), is used in many applications, especially medical radiology, to obtain two or three dimensional views of the interior of three dimensional bodies (CT or CAT Scans). The technique involves subjecting a three dimensional body to radiation that enters the body from many different angles. The amount of radiation that is scattered or reflected by the body is then detected as a function of the angle of scattering. The scattered data is then analyzed to construct an image of the interior of the body. A two dimensional "slice" of the interior can be "reconstructed", for example on a screen, and viewed. The slice can be reconstructed for any desired angle of intersection with the body.

While computerized tomography is well known, various specific mathematical reconstruction algorithms have been proposed to construct the image from the scattered radiation. However, it is becoming more challenging for known conventional reconstruction methods to meet the stringent constraints of current imaging applications. For example, the rates at which the impinging radiation beam scans the body has increased dramatically over the years, and the impinging radiation dosage has dropped significantly, especially in medical applications, because of patient safety concerns.

One area in which CT scans can be used is to detect lung pathology (i.e., disease in one or both lungs). Typically, the lungs are segmented from a CT scan in order to isolate the lungs from the rest of the image. Lung segmentation is typically a primary step for applications such as lung nodule detection and segmentation (i.e., the detection of and segmentation of masses of tissues in the lung), lung registration (i.e., automatic computation of the independent transformation of the right or left lung from one dataset to another from the same patient. The datasets are typically acquired at two different time points), volumetric analysis and pathology analysis such as emphysema detection, etc.

FIG. 1 shows a prior art 2-D image 100 before segmentation. The image includes a background area 104, a chest wall 108 (consisting of ribs and muscles), a right lung 112, and a left lung 116 The intensity level of the lungs is lower than that of the surrounding anatomies such as bones, muscles, and fat. A typical goal of lung segmentation is to extract the left and right lungs 112, 116 from the image 100.

A number of methods have been developed to extract the lung regions from a CT image (also referred to as a volume). Some methods are semi-automatic and involve user guidance. These methods often require a physician to designate a seed point inside the CT image. From this seed point, a lung region is grown. The image may then be thresholded. Thresholding an image occurs when pixels of the image that have a grey level higher (or lower) than a predetermined value, or threshold, is designated as being of interest, and the remaining pixels are designated as not being of interest. A histogram of the grey levels of the image may be used to determine a threshold for the lungs within the image. The results of these semi-automatic methods can be unsatisfactory and may require further manual corrections (e.g., because of the presence of other regions of similar density. This could bias the value of the automated threshold and, as a result, the lung may be over or under grown).

Automatic lung segmentation techniques have also been developed. Typically, lung regions are separated from their surrounding tissues based on a threshold. The threshold can be predefined from empirical results and can be determined dynamically at run-time based on image histograms (as described above). An iterative method may also be used to find a threshold.

In these techniques, algorithm speed is often affected by region-growing of the lungs. In particular, the growing of a lung region from a seed point is often computationally intensive and, as a result, the time required to perform the region growing is traditionally long relative to other operations.

Additionally, sometimes masses of tissues in the lung (i.e., lung nodules) are not included in a segmented lung region. In particular, some nodules touch the chest wall and possess the same intensity level as the chest wall. After thresholding is performed on the image to extract the lung regions, the nodules may be excluded from the extracted lung regions. Further, lung nodules typically cannot be correctly recovered by a set of morphological operations. As a result, lung nodules are often improperly excluded from segmented lungs.

Therefore, there remains a need to more efficiently segment lung regions from a CT image and further to accurately segment a lung having lung nodules.

BRIEF SUMMARY OF THE INVENTION

This invention provides a systematic technique of automatically segmenting lung regions. To increase the efficiency of a lung segmentation technique, a region-based technique, such as region growing, is first performed by a computer on the middle slice of the CT volume. A contour-based technique is then used for a plurality of non-middle slices of the CT volume. This allows the implementation to be multithreaded and results in an improvement in the segmentation algorithm's efficiency In one embodiment, tissues that are not related to the lungs are also detected (e.g., by comparing segmentation results from two consecutive slices). The comparison of the segmentation results may contain a large region of high intensity pixels, which may be removed.

In one embodiment, the segmenting of the middle slice further includes applying a median filter to the CT volume. The segmenting of the middle slice further includes removing non-body regions from the CT volume. The segmenting of the middle slice may also include locating a body region in the CT volume. The segmenting of the middle slice further includes labeling the lung regions. In one embodiment, the contour-based technique further includes one or more of lung border tracing, lung smoothing, and filling the lung regions.

Lung border tracing may include setting a starting point and a range to limit searching of the starting point. The lung border tracing may also include executing a chain-code algorithm. The lung smoothing may also include performing a rolling-ball method.

In another embodiment, the lung smoothing further includes calculating a curvature of contour points determined by the contour-based technique. The curvature of a target point between a first point and a second point is defined as:

$$\text{curvature} = \text{abs}(\theta_2 - \theta_1) \div d$$

where d is the total length from said first point to said second point.

DETAILED DESCRIPTION

In accordance with an embodiment of the present invention, a method and apparatus for automatically segmenting lung regions are described. A contour-based method to extract lung regions in 2D includes performing region growing in a "middle slice" of the CT volume. Segmentation may be executed on a slice-by-slice basis, thereby enabling multiple slices to be segmented at substantially the same time.

Figure 1:
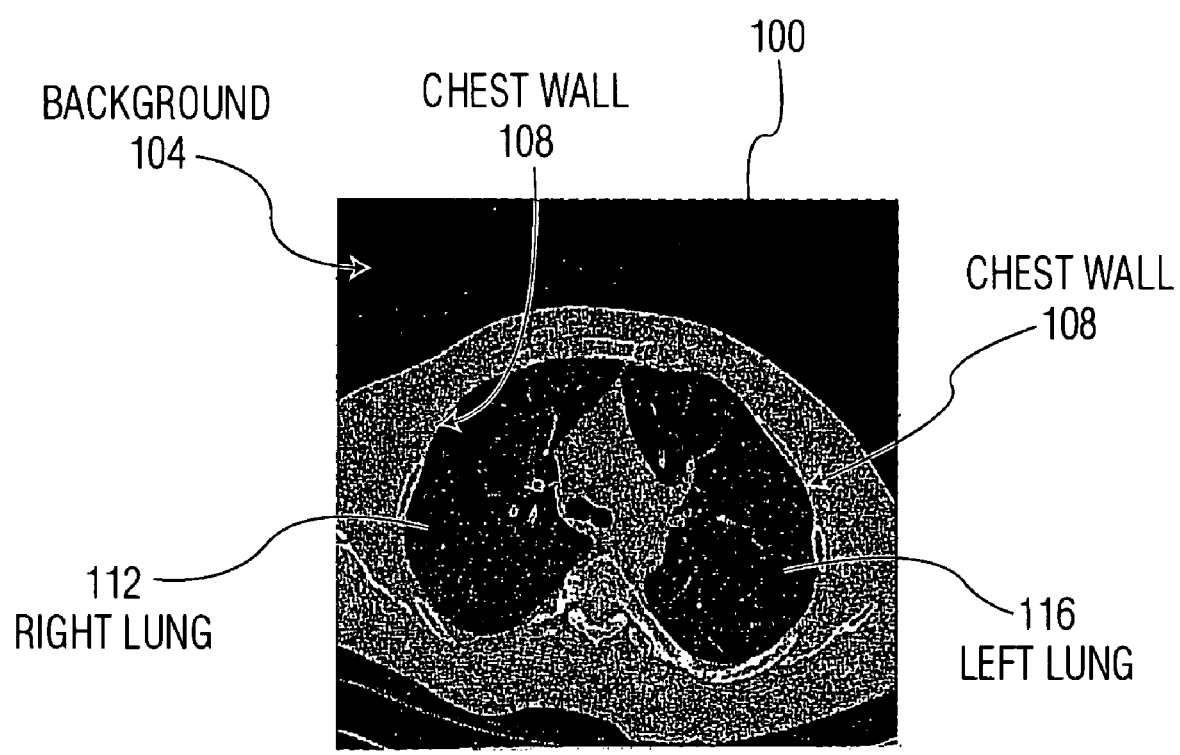
FIG. 1 is a prior art 2-D image including a background area, a chest wall (consisting of ribs and muscles), a right lung, and a left lung.
Figure 2:
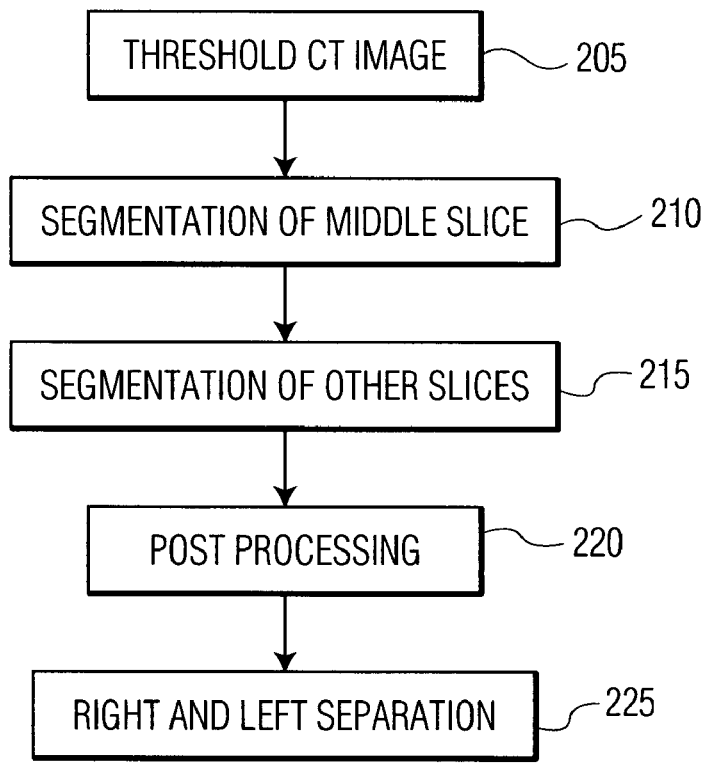
FIG. 2 is a flowchart illustrating the steps performed by a computer in accordance with an embodiment of the present invention.

FIG. 2 is a flowchart illustrating the steps performed by a computer in accordance with an embodiment of the present invention. The computer first thresholds a CT image in step 205 using a predetermined threshold. Lung parenchyma tissues (i.e., the respiratory portions of the lung) have a density level in the range of −910 HU (i.e., Hounsfield units) to −500 HU, while the chest wall, vessel and bone are above this level. In one embodiment, the predetermined threshold is set to −400 HU. This threshold can be used to extract the lung regions (when segmenting a middle slice, as described below) and may also be used as a criterion when judging whether a pixel belongs to the lung region or the chest wall.

As described in more detail below with respect to FIG. 3, the computer then segments a "middle slice" of the CT volume in step 210. As used herein, the "middle slice" of the CT volume refers to one (or more) slices that have a plurality of slices (e.g., the same number of slices) after and before the slice(s). The "middle slice" can therefore include one or a plurality of slices that have approximately the same number of slices before and after itself. Thus, the "middle slice" may refer to the slice in the middle of a plurality of slices (e.g., slice 4 out of 7 slices) or a slice that is the approximate middle of a plurality of slices (e.g., slice 3 out of 6 slices).

Unlike typical lung segmentation algorithms, the computer performs region labeling by a threshold on the middle slice of the CT volume. As described in more detail below, operations on other slices are contour-based operations. Therefore, segmentations on two consecutive slices are closely related. Further, the speed at which the algorithm executes improves because no three-dimensional region based algorithm is used.

The computer then segments the slices other than the middle slice in step 215. For slices other than the middle slice, the computer does not use region-based techniques because these techniques are time consuming. Further, it is often difficult to differentiate between real lung regions of a CT image and other low intensity anatomies of the CT image. Instead, lung regions are extracted by using contour based operations which include lung border tracing, smoothing, and then filling the lung regions.

The computer then performs post processing in step 220. The post processing includes detecting large tissues that are enclosed in the segmentation but are actually not lung tissues. In one embodiment, to search for such large tissues, segmentation results from two consecutive slices are compared. If the difference contains a large region of high intensity pixels, then the large region is a target region and needs to be removed. The computer then traces back to previous slices for segments that belong to this tissue and removes them (i.e., the computer goes back to previous slices to check where the target region has started in order to remove the target region from its beginning).

In one embodiment, the computer then performs right and left lung separation in step 225. For example, the computer may separate the right and left lungs for applications that depend on information specific to each lung (e.g., follow-up study of lung nodules). In this situation, the two lungs have different labels in the segmentation. In one embodiment, as the anterior and posterior junctions separating the left and right lungs may be thin, and the intensity of these tissues may be at the same level as that of the lung regions, the two lungs may be connected. In such a case, the computer can search in a particular region around the anterior or posterior junction to locate the junction line. The left and right lungs may then be separated by this line.

Figure 3:
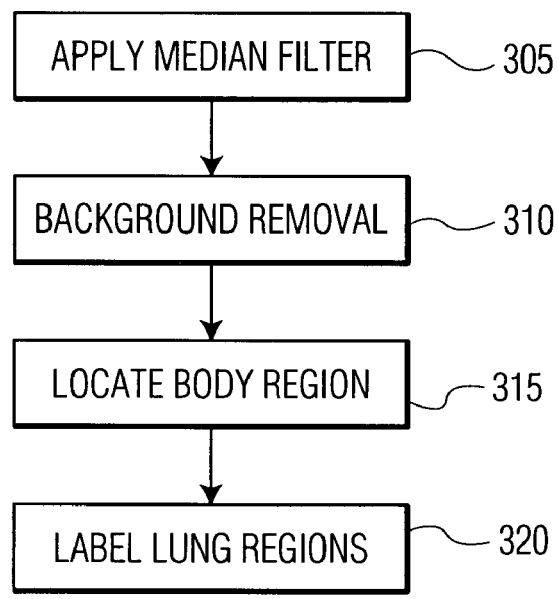
FIG. 3 is a flowchart illustrated the detailed steps performed by the computer to segment a middle slice of a CT scan in accordance with an embodiment of the present invention.

FIG. 3 is a flowchart illustrated the detailed steps performed by the computer to segment the middle slice (as introduced in step 210 of FIG. 2). First, the computer applies a median filter in step 305. A media filer is an image processing tool. It computes the median value (different from the average) of a region of interest and assigns it to the center of the region. It is typically used to uniform an image (get rid of a specific type of noise (e.g., speckle noise) that can be found in medical images). Filtering may be performed on each image pixel with its eight direct neighbors. Specifically, for each pixel of the image, the median value of the pixel's 3×3 neighborhood is determined (3×3 represents the size of the region of interest). The pixel is then replaced with the determined median value.

Non-body regions may then be removed in step 310. In particular, in some CT data, the regions outside the human body may have high intensity level. Before applying a threshold to separate lung regions from the chest wall, the high intensity regions that are outside the human body are removed. In one embodiment, a threshold value of 10000 HU is selected and the image is thresholded to remove these regions.

In step 315, the body region of the image is located. In one embodiment, the middle slice is labeled using a blob-coloring algorithm. The blob-coloring algorithm is an algorithm that labels regions of the image that have intensity level above a pre-defined threshold. The largest region is designated to be the body region that surrounds the two lungs.

The blob-coloring algorithm is typically efficient because the algorithm traverses the entire image (i.e., slice) in a single pass and checks two pixel neighbors instead of eight. The blob algorithm finds the different regions of an image and assigns them to a number in order of their "discovery". It typically starts from the bottom left corner of the image to the top right one. By doing so, it creates information about the pixel it visits for the next ones, as of being part of a specific region. Consequently, when checking a pixel, the algorithm needs to verify whether this current pixel is connected to previously detected regions by checking the pixel on its left and below it. The difference with a region growing algorithm is that the region growing starts anywhere within a region. It therefore needs to look all around to find its next neighbor (i.e., 8 pixels around instead of two for the blob-coloring algorithm).

The lung regions are then labeled in step 320. In one embodiment, locating the body region is performed to determine a range that contains the lung(s) and to remove other, unrelated partitions that are outside the body. With this range defined, blob-coloring is performed again to find the two (or one if they are connected) lung regions. This time, the goal is to label regions with their intensity below the threshold. With the low intensity regions labeled, the largest two regions are selected. The size of a lung region on the middle slice has to be larger than a pre-defined threshold. The sizes of the two selected regions are compared with the threshold. If both are larger than the threshold, then the two lungs are separated on this slice. If only one region is large enough, then the two lungs are connected. If neither of the two has a valid size, then this step is executed again on another slice until a valid lung region is obtained.

As described above, other slices are then segmented. As stated, for slices other than the middle slice, region growing is not used because region growing is time consuming. Further, it is often difficult to differentiate lung regions from other low intensity anatomies. Instead, lung regions are extracted by using contour-based operations. The contour-based operations can include lung border tracing, smoothing and filling the lung regions.

Before the computer begins tracing, in one embodiment a predetermined number of parameters (e.g., two) are set. For example, a starting point, which may be the bottom-left point of the lung region in the slice, is set. Second, a range that limits the searching is set. The parameters may be obtained from the segmentation result of the previous slice.

To determine the range that limits the searching, the range from a previous slice is inherited and enlarged (e.g., by 50 pixels on each of the four directions (left, right, top, and bottom)).

In one embodiment, to ensure a satisfactory performance (e.g., in terms of speed) and segmentation consistency (with the result from the previous slice), seed points are used to help locate the start points for all lung regions in the current slice.

Figure 4:
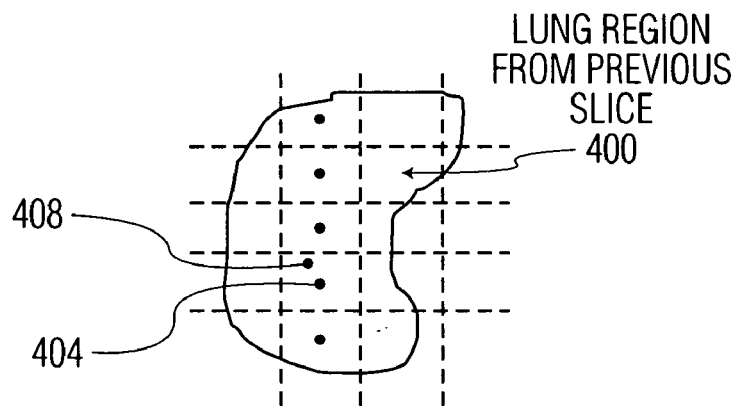
FIG. 4 is a lung region divided vertically into small regions in accordance with an embodiment of the present invention.

FIG. 4 shows a lung region 400 from a previous slice. The lung region 400 from the previous slice is divided vertically into small regions as shown. In one embodiment, each small region is no less than 30 pixels in height. A list of seed points is then constructed by extracting all center pixels (e.g., center pixel 404) of the sub-regions (e.g., sub-region 408). The list is then sorted by pixel y-coordinates. The computer then begins from the first point on the list and searches downwards until the region border. The bottom-left location of the sub-region is then recorded. This location can be used to start the tracing method.

For the other seeds left on the list, the computer checks if its residing sub-region has already been processed by the operations originated from a previous seed. If not, then the seed is taken as a new starting point and tracing begins again. In one embodiment, this routine continues until all seed points have been processed.

The computer then traces the lung borders. In particular, one output from the previous step is the bottom-left pixel location of the lung region being processed. This location is the start point of the tracing. A chain-code algorithm may then be used to trace lung borders. A chain-code algorithm is an algorithm that computes the contour of a region based on the 8 neighbors of the starting pixel. The chain code algorithm saves the direction of the next contour pixel and finally is represented by a starting point and a set of direction which compresses substantially the format of the contour.

Figure 5:
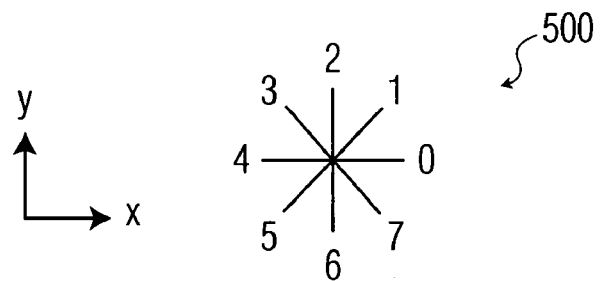
FIG. 5 shows the definition of the directions in an 8-connection neighborhood.

FIG. 5 shows the definition of the directions in an 8-connection neighborhood 500. At a contour point, starting from the current tracing direction, the computer searches counter-clockwise for the next contour point. If a contour point is found, the computer sets it as the current contour point and updates the new tracing direction as:

New direction=(Current direction+5) modulo 8

In one embodiment, the tracing continues until the tracing returns to the original starting point.

Figure 6:
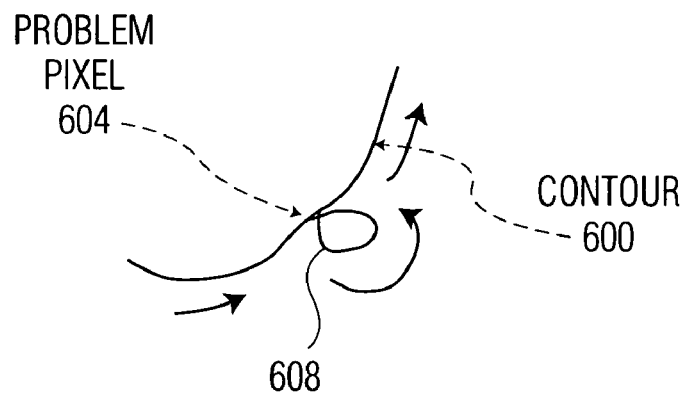
FIG. 6 shows a contour having a loop and a problem pixel.

In one embodiment, some contour points are crossed twice. FIG. 6 shows a contour 600 having a problem pixel 604. The problem pixel 604 is crossed twice because of loop 608 (i.e., the problem pixel 604 is crossed once on the way up the loop 608 and then again on the way down the loop 608). In this case, if the loop 608 is very small (e.g., less than 20 pixels), then this segment is removed from the contour. If the loop 608 is a large segment, then the crossed pixel is marked and may be processed differently in the smoothing step described below.

Figure 7:
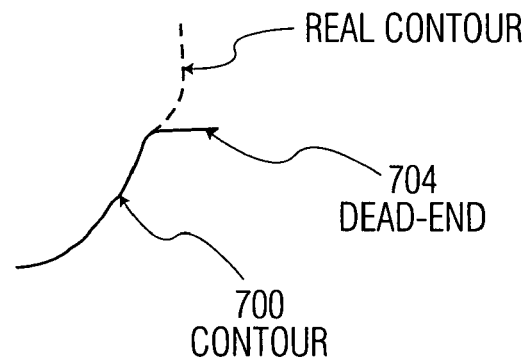
FIG. 7 shows a contour having a dead-end.

FIG. 7 shows a contour 700 having a dead-end 704. If the computer is tracing into dead-end 704, the tracing returns to the point where the dead-end 704 starts and then resumes normal tracing by adjusting a new tracing direction. Each pixel on the stick-like segment 704 is removed from the contour 700.

The lung borders are then smoothed. In particular, the lung borders may have some cavities that may be lung nodules. The computer may perform the smoothing step to recover these nodules that are attached to the chest wall. In one embodiment, a rolling-ball method is used to recover the nodules that are attached to the chest wall.

Figure 8:
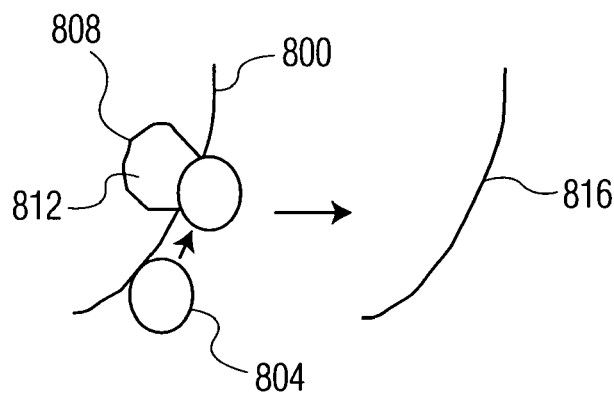
FIG. 8 shows using the rolling-ball method on a contour in accordance with an embodiment of the present invention.

FIG. 8 shows using the rolling-ball method on a contour 800. In 2-D, the rolling-ball method involves rolling a circle 804 along the contour 800 (i.e., lung boundary). At contour indentation 808, the circle 804 spans over the cavity 812. A straight line 816 is then drawn between the two intersection points to fill up the cavity 812. In one embodiment, two rolling balls are used in the rolling-ball algorithm—one with fixed size and one with an adaptive diameter that depends on the length of the local contour.

In one embodiment, to save on computation time, curvatures of all contour points are calculated first and only high curvature points are considered candidates to be smoothed. For example, when calculating curvature of a contour point, a window size of 13 pixels is chosen (e.g., 6 pixels on each side of the targeting point) and four pixel points are selected to calculate its curvature.

Figure 9:
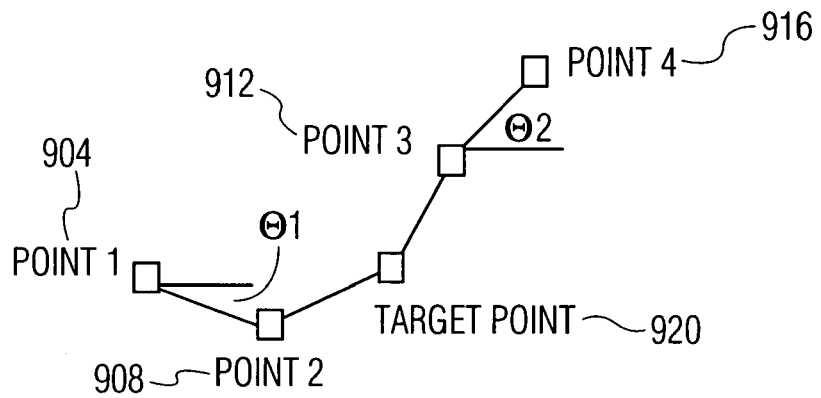
FIG. 9 shows a block diagram of four points and a target point whose curvature is being calculated in accordance with an embodiment of the present invention.

FIG. 9 shows a block diagram 900 of four points and a target point whose curvature is being calculated. The block diagram 900 includes Point 1 904, Point 2 908, Point 3 912, Point 4 916, and a Target point 920. In one embodiment, Point 1 904 and Point 2 908 are the sixth and the third points to the Target point's left and Point 3 912 and Point 4 916 are the third and sixth points to the Target point's right. The curvature of the Target Point 920 can be defined as:

$$curvature = abs(\theta 2 - \theta 1) \div d$$

where d is the total length from Point 1 904 to Point 4 916. The computer then fills the lung regions that are enclosed in the smoothing step described above and the filled regions are the final lung regions.

Figure 10:
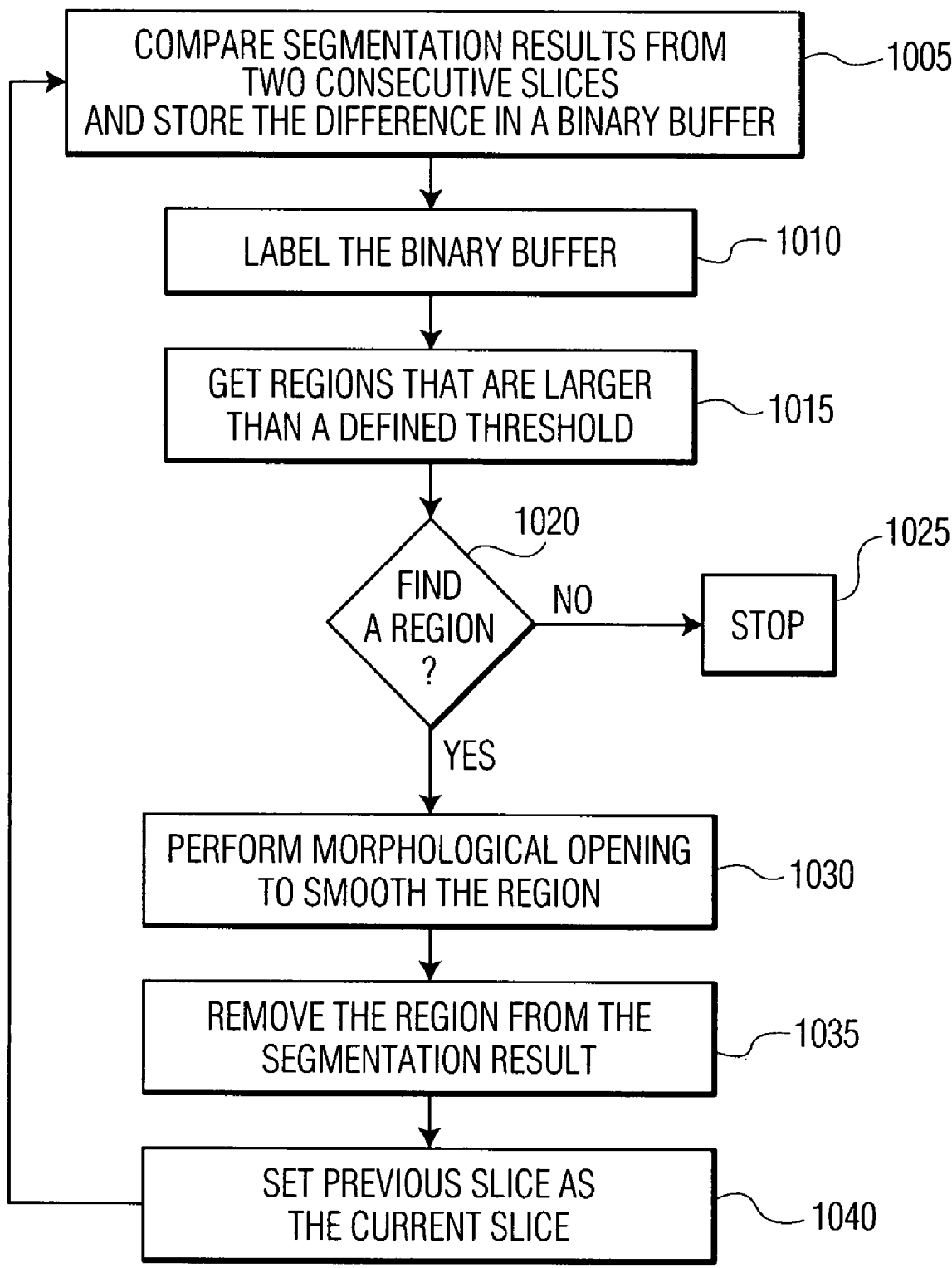
FIG. 10 shows a flowchart of the steps performed during a post processing step in accordance with an embodiment of the present invention.

FIG. 10 shows a flowchart of an embodiment of the steps performed during the post processing step (described above with respect to step 220 of FIG. 2). The post processing step includes detecting large tissues that are enclosed in the segmentation but are actually not lung tissues To search for such large tissues, segmentation results from two consecutive slices are compared and the difference is stored in a binary buffer in step 1005. The binary buffer is then labeled in step 1010. In one embodiment, only high intensity pixels are labeled. Regions that are larger than a defined threshold are then obtained in step 1015. If a region larger than the defined threshold isn't found in step 1020, then the algorithm stops in step 1025.

If a region that is larger than the defined threshold is found in step 1020, the computer performs a morphological opening. The morphological opening is a morphological operator used to smooth the region. The region is then removed from the segmentation result in step 1035. The previous slice is then set as the current slice in step 1040 and the algorithm returns to step 1005.

Figure 11:
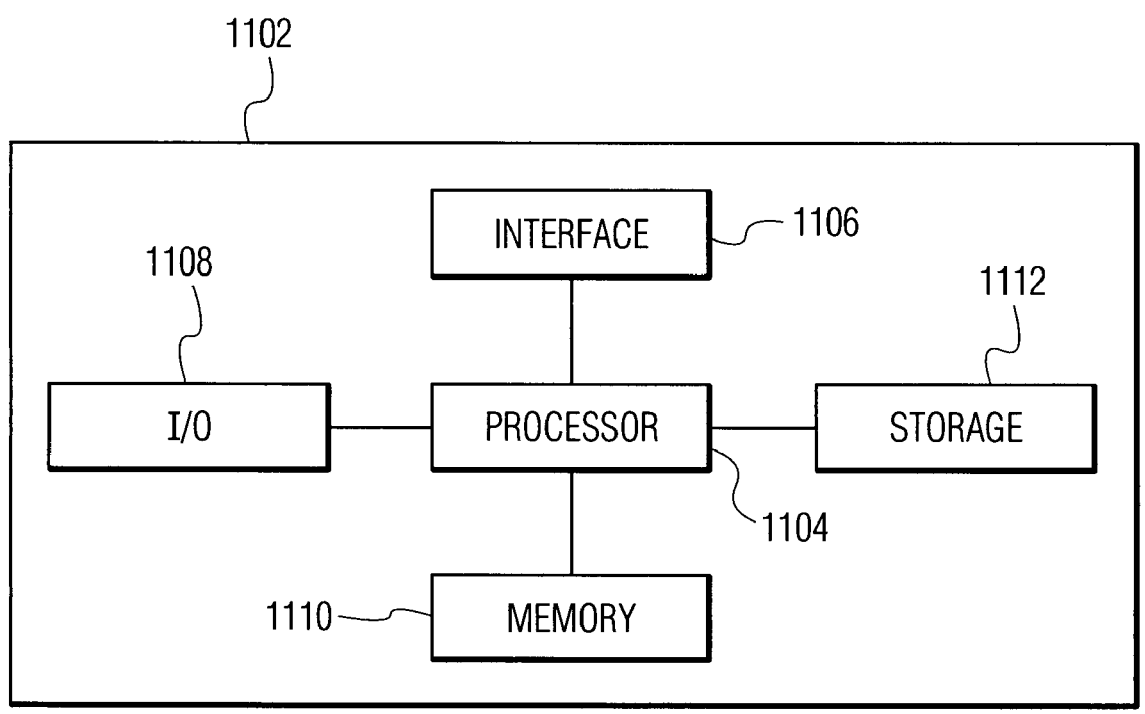
FIG. 11 shows a high level block diagram of a computer in accordance with an embodiment of the present invention.

The description herewith describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 11. Computer 1102 contains a processor 1104 which controls the overall operation of computer 1102 by executing computer program instructions which define such operation. The computer program instructions may be stored in a storage device 1112 (e.g., magnetic disk) and loaded into memory 1110 when execution of the computer program instructions is desired. Computer 1102 also includes one or more interfaces 1106 for communicating with other devices (e.g., locally or via a network). Computer 1102 also includes input/output 1108 which represents devices which allow for user interaction with the computer 1102 (e.g., display, keyboard, mouse, speakers, buttons, etc.).

One skilled in the art will recognize that an implementation of an actual computer will contain other components as well, and that FIG. 11 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

Thus, a contour-based approach is used to segment the lung regions. The contour-based approach is a fully automatic method and typically performs much faster than a region-based approach. In accordance with an embodiment of the present invention, lung regions are segmented as a whole and each individual anatomic region (e.g., trachea, bronchi, vessel, lung lobe, etc.) are not extracted individually. The algorithm can be implemented in a lung nodule detection system since it does not require individual segmentation and because of the algorithm's treatment on chest wall attaching nodules. The segmented lung can also be used in many applications, such as in lung cancer screening, lung registration, and other lung pathology analysis. The algorithm can be applied in applications that have higher performance requirements.

Figure 12:
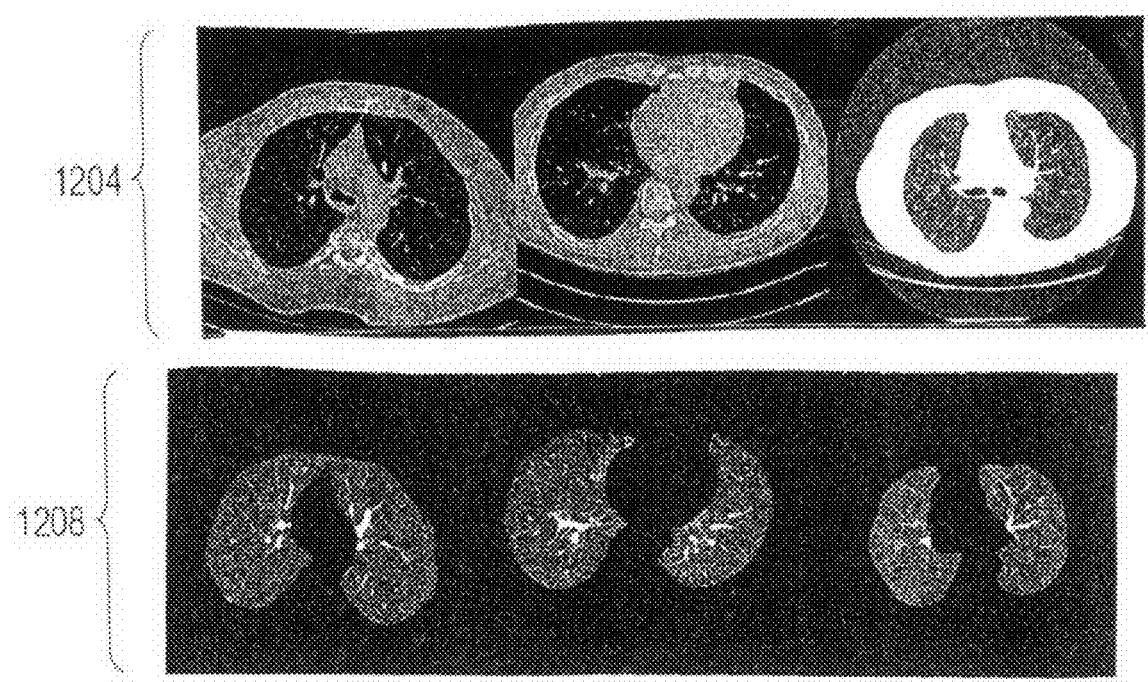
FIG. 12 shows segmentation results in accordance with an embodiment of the present invention.

FIG. 12 shows segmentation results using the algorithm described above. In particular, the top row 1204 shows the original CT image and the bottom row shows the segmented lungs 1208 (segmented using the algorithm described above).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of segmenting lungs from a Computerized Tomography (CT) volume comprising a plurality of slices, said method comprising:
using a processor to perform steps comprising:
thresholding said CT volume using a predetermined threshold;
segmenting a middle slice of said CT volume using a region-based technique; and
segmenting a plurality of non-middle slices of said CT volume using a contour-based technique, without using a region-based technique for the non-middle slices.

2. The method of claim 1 further comprising detecting tissues that are not related to said lungs.

3. The method of claim 2 further comprising comparing segmentation results from two consecutive slices.

4. The method of claim 3 further comprising determining if the comparison of said segmentation results contains a region of pixels having a size above a predetermined size threshold and an intensity above a predetermined intensity threshold.

5. The method of claim 4 further comprising removing said region of pixels.

6. The method of claim 1 wherein said segmenting of said middle slice further comprises applying a median filter to said CT volume.

7. The method of claim 1 wherein said segmenting of said middle slice further comprises removing non-body regions from said CT volume.

8. The method of claim 1 wherein said segmenting of said middle slice further comprises locating a body region in said CT volume.

9. The method of claim 1 wherein said segmenting of said middle slice further comprises labeling said lung regions.

10. The method of claim 1 wherein said contour-based technique further comprises at least one of lung border tracing, lung smoothing, and filling lung regions.

11. The method of claim 10 wherein said lung border tracing further comprises setting a starting point and a range to limit searching.

12. The method of claim 11 wherein said lung border tracing further comprises executing a chain-code algorithm.

13. The method of claim 10 wherein said lung smoothing further comprises performing a rolling-ball method.

14. The method of claim 10 wherein said lung smoothing further comprises calculating a curvature of contour points determined by said contour-based technique.

15. The method of claim 14 wherein said curvature of a target point between a first point and a second point is defined as $$\text{curvature} = \text{abs}(\theta_2 - \theta_1) \div d$$

where d is the total length of a path defined by a plurality of segments between said first point to said second point and θ1 and θ2 are angles defined at least in part by one or more of said segments.

16. An apparatus for segmenting lungs from a Computerized Tomography (CT) volume comprising a plurality of slices, said apparatus comprising:
   means for thresholding said CT volume using a predetermined threshold;
   means for segmenting a middle slice of said CT volume using a region-based technique; and
   means for segmenting a plurality of non-middle slices of said CT volume using a contour-based technique, without using a region-based technique for the non-middle slices.

17. The apparatus of claim 16 wherein said means for segmenting said middle slice further comprises means for applying a median filter to said CT volume.

18. The apparatus of claim 16 wherein said means for segmenting said middle slice further comprises means for removing non-body regions from said CT volume.

19. The apparatus of claim 16 wherein said means for segmenting said middle slice further comprises means for locating a body region in said CT volume.

20. The apparatus of claim 16 wherein said means for segmenting said middle slice further comprises means for labeling said lung regions.

21. The apparatus of claim 16 wherein said contour-based technique further comprises means for at least one of lung border tracing, lung smoothing, and filling lung regions.

22. The apparatus of claim 21 wherein said means for lung border tracing further comprises means for executing a chain-code algorithm.

23. The apparatus of claim 21 wherein said means for lung smoothing further comprises means for performing a rolling-ball method.

24. The apparatus of claim 23 wherein said means for lung smoothing further comprises means for calculating a curvature of contour points determined by said contour-based technique.

25. A non-transitory computer readable medium comprising computer program instructions capable of being executed in a processor and defining the steps comprising:
   thresholding a CT volume using a predetermined threshold;
   segmenting a middle slice of said CT volume using a region-based technique; and
   segmenting a plurality of non-middle slices of said CT volume using a contour-based technique, without using a region-based technique for the non-middle slices.

26. The computer readable medium of claim 25 further comprising the step of detecting tissues that are not related to said lungs.

27. The computer readable medium of claim 25 wherein the step of segmenting said middle slice further comprising the step of applying a median filter to said CT volume.

28. The computer readable medium of claim 25 wherein the step of segmenting said middle slice further comprises the step of removing non-body regions from said CT volume.

29. The computer readable medium of claim 25 wherein the step of segmenting said middle slice further comprises the step of locating a body region in said CT volume.

30. The computer readable medium of claim 25 wherein the step of segmenting said middle slice further comprises the step of labeling said lung regions.

31. The computer readable medium of claim 25 wherein said contour-based technique further comprises at least one of lung border tracing, lung smoothing, and filling lung regions.

32. The computer readable medium of claim 31 wherein said lung smoothing further comprises calculating a curvature of contour points determined by said contour-based technique.

* * * * *